(12) United States Patent
Baker (10) Patent No.: US 10,830,373 B1
(45) Date of Patent: Nov. 10, 2020

(54) DUMP HANDLE LOCKING DEVICE FOR SECURING A SANITATION DUMP LOCK

(71) Applicant: Kenneth Wayne Baker, Medford, OR (US)

(72) Inventor: Kenneth Wayne Baker, Medford, OR (US)

( * ) Notice: Subject to any disclaimer, the term of this patent is extended or adjusted under 35 U.S.C. 154(b) by 55 days.

(21) Appl. No.: 16/266,020

(22) Filed: Feb. 2, 2019

Related U.S. Application Data (60) Provisional application No. 62/628,874, filed on Feb. 9, 2018.

(51) Int. Cl.
| | |
|---|---|
| *F16K 35/06* | (2006.01) |
| *E05B 13/00* | (2006.01) |
| *F16K 35/10* | (2006.01) |
| *B60R 15/00* | (2006.01) |
| *F16K 35/12* | (2006.01) |

(52) U.S. Cl.
CPC ............ *F16K 35/06* (2013.01); *E05B 13/002* (2013.01); *F16K 35/10* (2013.01); *B60R 15/00* (2013.01); *F16K 35/12* (2013.01)

(58) Field of Classification Search
CPC .......... F16K 35/06; F16K 35/10; F16K 35/12; E05B 13/002; B60R 15/00
USPC ................. 251/101, 102, 104, 105, 111, 113
See application file for complete search history.

(56) References Cited

U.S. PATENT DOCUMENTS

| | | | | |
|---|---|---|---|---|
| 853,168 | A * | 5/1907 | Garbe ..................... | F16K 35/06 137/385 |
| 915,159 | A * | 3/1909 | Buttorff .................. | F16K 35/06 137/385 |
| 927,308 | A * | 7/1909 | Wilton .................... | F16K 35/10 70/180 |
| 1,243,558 | A * | 10/1917 | Ryan ....................... | F16K 35/06 70/176 |
| 1,530,814 | A * | 3/1925 | Credle .................... | F16K 35/10 70/178 |
| 1,563,224 | A * | 11/1925 | Peabody ................. | F16K 35/10 70/180 |
| 1,947,081 | A * | 2/1934 | Grady ..................... | F16K 35/10 70/178 |
| 2,136,216 | A * | 11/1938 | Martin .................... | F16K 35/10 137/384 |
| 2,390,972 | A * | 12/1945 | Weinberg ................ | F16K 35/10 70/180 |

(Continued)

*Primary Examiner* — Umashankar Venkatesan
(74) *Attorney, Agent, or Firm* — Jerry Haynes Law (57) ABSTRACT

A dump handle locking device inhibits tampering with a dump handle of a tank dump valve assembly. A handle portion and a barrier portion interface with respective ends of the tank dump valve assembly. The handle portion and the barrier portion are releasably locked together through a lock mechanism, which restricts displacement of the dump handle that controls movement of a barrier covering the pipe opening. A key regulates fastening and unfastening of the lock mechanism. Consequently, the dump handle is restricted from axial displacement, remaining in a closed position. In some embodiments, handle portion is a valve handle box that encapsulates the dump handle, and barrier portion is a lock plate interfacing with pipe section in tank dump valve assembly. In other embodiments, handle portion is a valve handle cable that attaches to the dump handle, and barrier portion is a barrier cable that attaches to the pipe section.

2 Claims, 5 Drawing Sheets

(56) References Cited

U.S. PATENT DOCUMENTS

| | | | |
|---|---|---|---|
| 2,838,064 A | | 5/1956 | Schieberl |
| 3,156,256 A | | 11/1964 | Weaver |
| 3,865,130 A | * | 2/1975 | Mullis .................... F16K 35/10 |
| | | | 137/385 |
| 3,976,095 A | * | 8/1976 | Koch ..................... F16K 35/06 |
| | | | 137/385 |
| 4,208,893 A | | 6/1980 | Avrich et al. |
| 4,498,320 A | | 2/1985 | Mullis |
| 4,781,044 A | | 11/1988 | Ortega |
| 6,164,318 A | * | 12/2000 | Dixon .................... F16K 35/12 |
| | | | 137/383 |
| 6,170,306 B1 | | 1/2001 | Kitley et al. |
| 7,044,148 B2 | | 5/2006 | Berger et al. |
| 9,297,477 B2 | | 5/2016 | Yoder |
| 2006/0042694 A1 | | 3/2006 | Reineck |
| 2011/0277853 A1 | | 11/2011 | Burmesch |
| 2014/0116536 A1 | | 5/2014 | Resendiz |

\* cited by examiner

DUMP HANDLE LOCKING DEVICE FOR SECURING A SANITATION DUMP LOCK

CROSS-REFERENCE TO RELATED APPLICATIONS

This application claims the benefits of U.S. provisional application No. 62/628,874, Feb. 9, 2018 and entitled SANITATION DUMP LOCK ASSEMBLY, which provisional application is incorporated by reference herein in its entirety.

FIELD OF THE INVENTION

The present invention relates generally to a dump handle locking device for securing a sanitation dump lock. More so, the dump handle locking device inhibits tampering with a dump handle of a tank dump valve assembly through use of a handle portion and a barrier portion that interface with respective ends of the tank dump valve assembly; whereby the handle portion and the barrier portion are releasably locked together through a lock mechanism, which restricts displacement of the dump handle that controls movement of a barrier covering the pipe opening; and whereby a key regulates fastening and unfastening of the lock mechanism.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, sewage systems, and specifically the tank dump valve assembly of recreational mobile vehicles, such as RV's, 5th wheels, camper trailers and marine craft, are used to transfer raw sewage from vehicle holding tanks to sewage disposal stations. Owners of recreational mobile vehicles connect the outlet of the sewage waste system to the inlet of a macerator, and the outlet of the macerator connects to one end of a hose, the opposite end of which is adaptable for coupling to a disposal pipe of a remote sewage dump station.

The tank dump valves themselves can installed in any orientation that the manufacturer of the RV deems appropriate. In one embodiment, there is no turning or twisting movement requirement for the dump handle for these types of tank dump valves, as they are a simple push in (closed) or pull out (open). In one tank dump valve assembly design, the distance from the closed (in) position to the open (out) position is approximately 4½". The closed (in) position is about 1 1/16", which is approximately where the device 100 is retained in relation when installed.

Unfortunately, the dump handles that regulate a barrier across the pipe opening for these dump tank sewage systems is easy to manipulate and tamper with. Such a dump tank sewage system therefore requires a locking device to prevent tampering with. Many of the locking devices that operate with such dump tank systems are easy to overcome and damage however. They can also be difficult to operate.

Other proposals have involved tamper resistant systems for dump tank sewage systems. The problem with these locking devices is that they do not fit universally on different types and sizes of dump systems. Also, they can be easy to overcome the locking mechanism contained therein. Even though the above cited locking devices meets some of the needs of the market, a dump handle locking device for securing a sanitation dump lock that inhibits tampering through use of a handle portion and a barrier portion that interface with respective ends of the tank dump valve assembly; such that the handle portion and the barrier portion are releasably locked together through a lock mechanism, which restricts displacement of the dump handle that controls movement of a barrier covering the pipe opening; and such that a key regulates fastening and unfastening of the lock mechanism, is still desired.

SUMMARY

Illustrative embodiments of the disclosure are generally directed to a dump handle locking device for securing a sanitation dump lock. The locking device is configured to interface with a tank dump valve assembly, so as to inhibit manipulation of a dump handle that regulates opening and closing of the tank dump valve assembly. The locking device provides a handle portion and a barrier portion that interface with respective ends of a tank dump valve assembly.

The handle portion attaches to the dump handle, and the barrier portion attaches to a pipe section of the tank dump valve assembly. The handle portion and the barrier portion are releasably locked together through a lock mechanism. A key regulates the fastening and unfastening of the lock mechanism. In this manner, a dump handle that operates the tank dump valve assembly is restricted from axial displacement, and thereby a restrictive barrier across the pipe opening remains in a closed position.

In some embodiments, the handle portion is a valve handle box that encapsulates the dump handle, and the barrier portion is a lock plate that interfaces with a barrier in the tank dump valve assembly. The lock mechanism forms a nexus to releasably lock the valve handle box and the lock plate.

In other embodiments, the handle portion is a valve handle cable that attaches to the dump handle, and the barrier portion is a barrier cable that attaches to a pipe section of the tank dump valve assembly. The lock mechanism forms a nexus to releasably lock the handle cable and the barrier cable.

In one embodiment, a dump handle locking device for securing a sanitation dump lock, comprises a tank dump valve assembly, as commonly used to regulate dumping of fluids and waste from a trailer or other building. The tank dump valve assembly comprises a pipe section that is defined by a pipe opening to enables passage of a fluid.

The tank dump valve assembly further comprises a barrier that is displaceable between an open position and a closed position to uncover and cover the pipe opening. The tank dump valve assembly further comprises a dump handle that is attached to the barrier. The dump handle is axially displaceable to control the position of the barrier between an open position uncovering the pipe opening and a closed position covering the pipe opening.

In some embodiments, the dump handle locking device comprises a handle portion that is detachably joined to the dump handle. The handle portion is defined by a first flange having at least one first fastening hole.

In some embodiments, the dump handle locking device comprises a barrier portion that is adjacent, and detachably attached to the barrier. The barrier portion is defined by a second flange having at least one second fastening hole corresponding to the first fastening hole of the first flange.

In some embodiments, the dump handle locking device comprises a lock mechanism that securely fastens, and releasably unfastens the handle portion and the barrier portion to each other. The lock mechanism comprises at least one bolt. The bolt of the lock mechanism extends and retracts through the first fastening hole in the first flange, and the second fastening hole in the second flange.

Thus, extending the bolt through the fastening holes works to fasten the handle portion to the barrier portion. This restricts axial displacement of the dump handle, so that the barrier is restricted to the closed position. Conversely, retracting the bolt out of the fastening holes unfastens the handle portion from the barrier portion. This enables axial displacement of the dump handle.

In some embodiments, the dump handle locking device comprises a key that is operable with the lock mechanism. The key selectively fastens and unfastens the bolt to extend and retract through the fastening holes. In this manner, fastening the bolt with the key restricts the dump handle from axial displacement. And unfastening the bolt with the key releases the dump handle to enable displacement of the barrier to the open position.

In another aspect, the handle portion comprises a valve handle box.

In another aspect, the valve handle box is defined by a block shape having an opening and forming a voluminous inner cavity that enables at least partially encapsulation of the dump handle of the tank dump valve assembly.

In another aspect, the valve handle box comprises a box flange forming a plurality of fastening holes.

In another aspect, the barrier portion comprises a lock plate defined by a flat panel and a plate flange, the panel being disposed perpendicularly to the plate flange.

In another aspect, the panel is fastenable to the pipe section of the tank dump valve assembly.

In another aspect, the plate flange forms a plurality of fastening holes corresponding to the fastening holes of the box flange.

In another aspect, the lock mechanism is operable between the plate flange and the box flange for fastening the valve handle box to the lock plate.

In another aspect, the lock mechanism comprises at least one bolt and a lock.

In another aspect, the bolt is sized and dimensioned to pass through the fastening holes in the box flange and the plate flange.

In another aspect, the key is operable with the lock mechanism to displace the bolt through the lock, whereby the key unfastens the lock mechanism from between the first flange and the box flange.

In another aspect, the dump handle has a thickness of up to 6".

In another aspect, the valve handle box is rectangular and has dimensions of about 4" length and 2½" width.

In another aspect, the device further comprises at least one fastener for fastening the lock plate to the pipe section.

In another aspect, the lock plate has dimensions of about 4¾" length and 2½" width.

In another aspect, the at least one bolt comprises two bolts disposed in a spaced-apart relationship.

In another aspect, the tank dump valve assembly comprises a 3" valve.

In another aspect, the dump handle extends and retracts laterally in relation to the pipe section.

In another aspect, the handle portion comprises a valve handle cable defined by a mount end and a free end, the mount end of the valve handle cable being fixedly attached to the dump handle, the free end of the valve cable handle being releasably attached to the lock mechanism.

In another aspect, the barrier portion comprises a barrier cable, the barrier cable being fixedly attached to the pipe section of the tank dump valve assembly at opposite ends, the barrier cable passing through the lock mechanism, whereby the valve handle cable and the barrier cable are operatively connected for restricting axial displacement of the dump handle.

In another aspect, the ends of the valve handle cable comprise at least one ring anchor and a washer.

In another aspect, the at least one fastener fastens the ends of the barrier cable to the pipe section.

One objective of the present invention is to prevent unauthorized opening of a tank dump valve assembly through use of a restrictive locking device that is sized and dimensioned to fit a dump handle, a pipe section, and a barrier of the tank dump valve assembly.

Another objective is to prevent accidental dumping of fluids and waste through the pipe section of the tank dump valve assembly.

Another objective is to restrict axial displacement of the dump handle.

Another objective is to fully encapsulate variously sized dump handles in the valve handle box.

Yet another objective is to provide a lock mechanism that easily interfaces the box flange 104 and the plate flange.

Yet another objective is to provide a tamper resistant locking device for recreational vehicle tank dump valves.

Yet another objective is to provide an inexpensive to manufacture sanitation dump locking device for a tank dump valve assembly.

Yet another objective is to enhance sanitation around trailer parks and other places where a tank dump valve assembly is operational.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A dump handle locking device 100, and various embodiments thereof, is referenced in FIGS. 1-8. As referenced in FIG. 1, the dump handle locking device 100, hereafter "locking device 100", is configured to prevent unauthorized opening and closing of a tank dump valve assembly 200, commonly used to regulate discharge of fluid and waste. The locking device 100 is configured to interface with the tank dump valve assembly 200, so as to inhibit axial displacement of a dump handle that regulates a barrier 208 that moves between an open position 206a and a closed position 206b across a pipe section 204 of the tank dump valve assembly 200. Thus, by releasably fastening the dump handle 202 to restrict axial movement, the barrier 208 is fastened to the closed position across the pipe opening 210 of the pipe section 204; and thereby accidental or intentional dumping of fluids and waste through the pipe opening 210 is prevented.

Those skilled in the art will recognize that the sewage systems, and specifically the tank dump valve assembly 200 of recreational mobile vehicles, such as RV's, 5th wheels, camper trailers and marine craft, are used to transfer raw sewage from vehicle holding tanks to sewage disposal stations. Owners of recreational mobile vehicles connect the outlet of the sewage waste system to the inlet of a macerator, and the outlet of the macerator connects to one end of a hose, the opposite end of which is adaptable for coupling to a disposal pipe of a remote sewage dump station.

The tank dump valves themselves can installed in any orientation that the manufacturer of the RV deems appropriate. In one embodiment, there is no turning or twisting movement requirement for the dump handle 202 for these types of tank dump valves, as they are a simple push in (closed) or pull out (open). In one tank dump valve assembly design, the distance from the closed position 206b (in) to the open position 206a (out) is approximately 4½". The closed position 206b is about 1 1/16", which is approximately where the locking device 100 is retained in relation with the dump handle 202 and pipe section 204 when installed.

Figure 2:
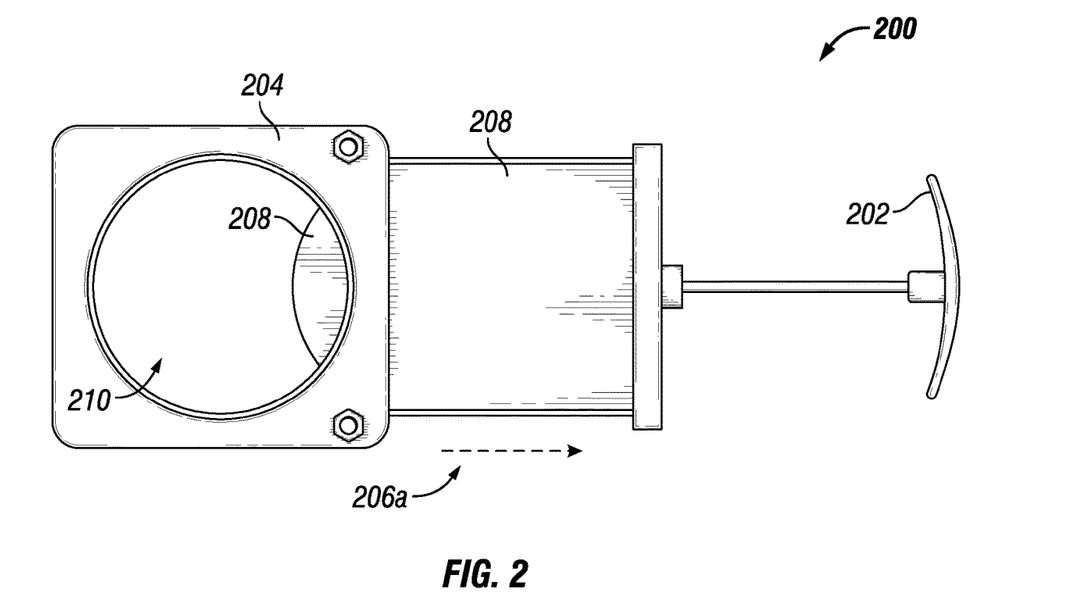
FIG. 2 illustrates a top view of an exemplary tank dump valve assembly with a barrier displaced to an open position, in accordance with an embodiment of the present invention.

FIG. 2 illustrates an exemplary tank dump valve assembly 200 commonly used to regulate the discharge waste from a recreational vehicle. The tank dump valve assembly 200 comprises a pipe section 204 for carrying waste out of the recreational vehicle, and a terminal pipe opening 210 for discharge thereof. In one embodiment, a 3" pipe section 204 may be used. The tank dump valve assembly 200 further comprises a dump handle 202 that can be gripped and axially displaced to regulate an attached barrier 208. The barrier 208 is displaceable between an open position 206a and a closed position 206b to uncover and cover the pipe opening 210.

Figure 3:
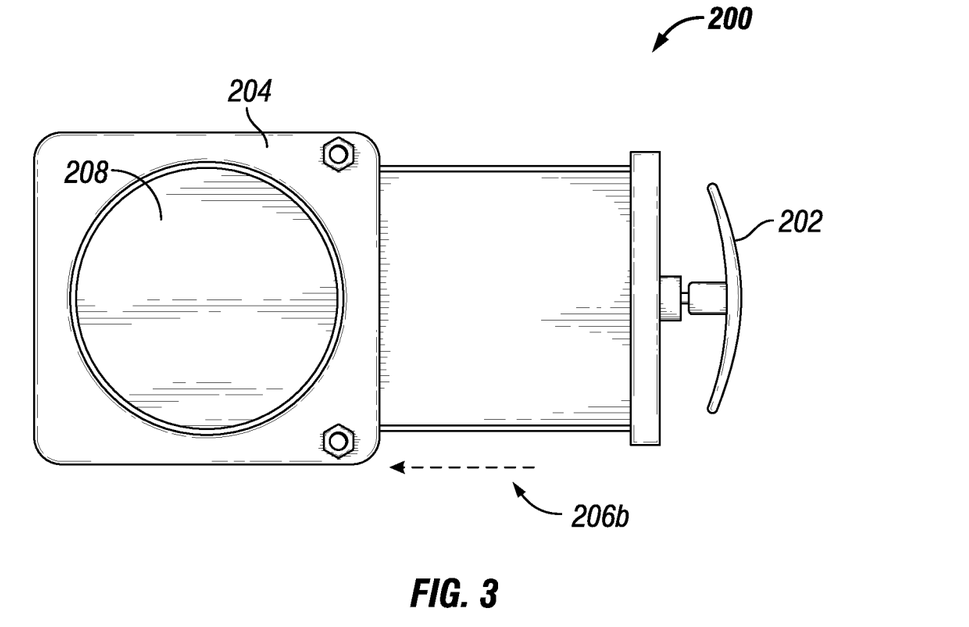
FIG. 3 illustrates a top view of the tank dump valve assembly shown in FIG. 2, with the barrier displaced to a closed position, in accordance with an embodiment of the present invention.

In one exemplary configuration of the tank dump valve assembly 200 shown in FIG. 2, the barrier 208 is shown in the open position 206a with the dump handle 202 fully extended (outwardly), away from the pipe section 204 at a distance of about 4½". Conversely, FIG. 3 illustrates the barrier 208 in the closed position 206b with the dump handle 202 fully retracted (inwardly), proximal to the pipe section 204 at a distance of about 1 1/16".

Figure 4:
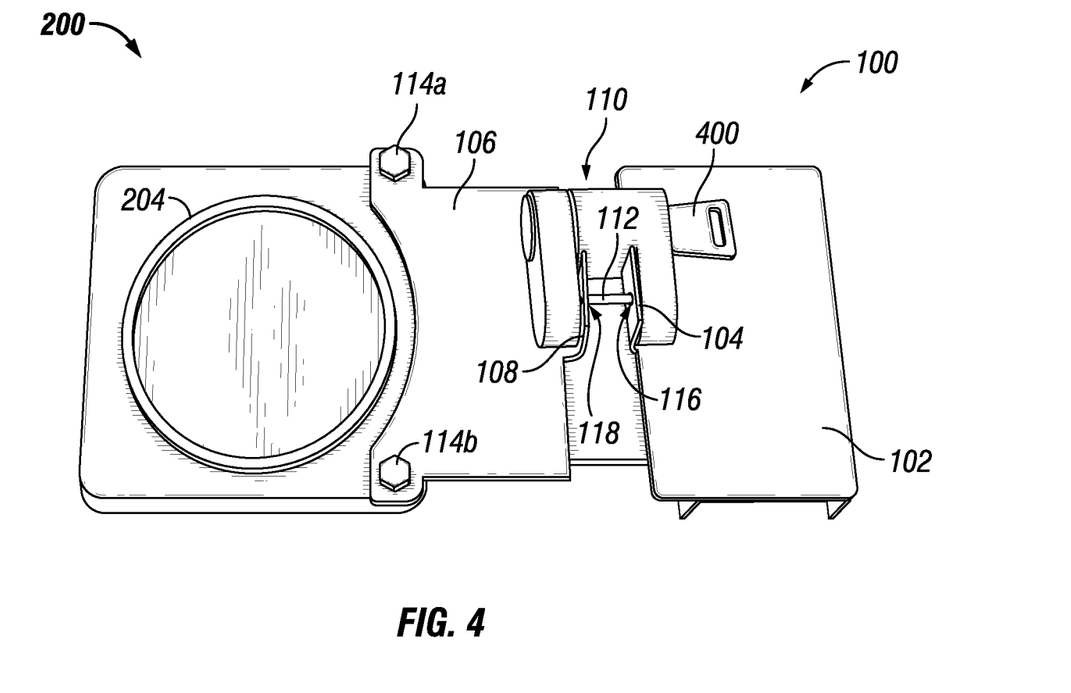
FIG. 4 illustrates a top view of the dump handle locking device operatively attached to a tank dump valve assembly and the lock mechanism restricting the dump handle to the closed position, in accordance with an embodiment of the present invention.

Turning now to FIG. 4, the locking device 100 comprises a handle portion 102 and a barrier portion 106 that detachably attach to each other while interfaced with their respective sections of the tank dump valve assembly 200. The handle portion 102 and the barrier portion 106 are releasably locked together through a lock mechanism 110 and a key 400. In this manner, the dump handle 202 that displaces the barrier 208 is restricted from axial displacement, and thereby retains the barrier 208 in the closed position.

The handle portion 102 detachably attaches to the dump handle 202. The handle portion 102 comprises at least one first flange 104 forming at least one first fastening hole 116. The first flange 104 is configured to align with, and rest flush with the dump handle 202 of the tank dump valve assembly 200 for fastening thereto. The first fastening hole 116 enables passage of at least one fastener 114a, 114b that securely fastens the handle portion 102 to the dump handle 202. The fastener 114a-b may include, without limitation, a screw, a bolt, an anchor, a magnet, and an adhesive.

In embodiments where the dump handle 202 comprises a stem and a grip, the handle portion 102 may either encapsulate the grip, or fixedly attach to the stem. In either configuration, the handle portion 102 is releasably, yet securely, attached to the dump handle 202 of the tank dump valve assembly 200. Suitable materials for the barrier portion 106 may include, without limitation, aluminum, steel, metal alloys, and a rigid polymer.

The barrier portion 106 detachably attaches to the barrier 208, adjacently to the handle portion 102. The barrier portion 106 comprises at least one second flange 108 forming at least one second fastening hole 118. In some embodiments, the second fastening hole 118 corresponds to the first fastening hole 116 of the first flange 104. The second flange 108 is configured to align with, and rest flush with the pipe section 204 of the tank dump valve assembly 200 for fastening thereto.

The second fastening hole 118 enables passage of the at least one fastener 114a-b that securely fastens the barrier portion 106 to the pipe section 204. The fastener 114a-b may include, without limitation, a screw, a bolt, an anchor, a magnet, and an adhesive. In embodiments where the pipe section 204 comprises a perimeter region, the barrier portion 106 may fixedly attach to the perimeter region at the edge of the pipe opening 210. In this manner, the barrier portion 106 is releasably, yet securely, attached to the pipe section 204 of the tank dump valve assembly 200. Suitable materials for the barrier portion 106 may include, without limitation, aluminum, steel, metal alloys, and a rigid polymer.

Figure 6:
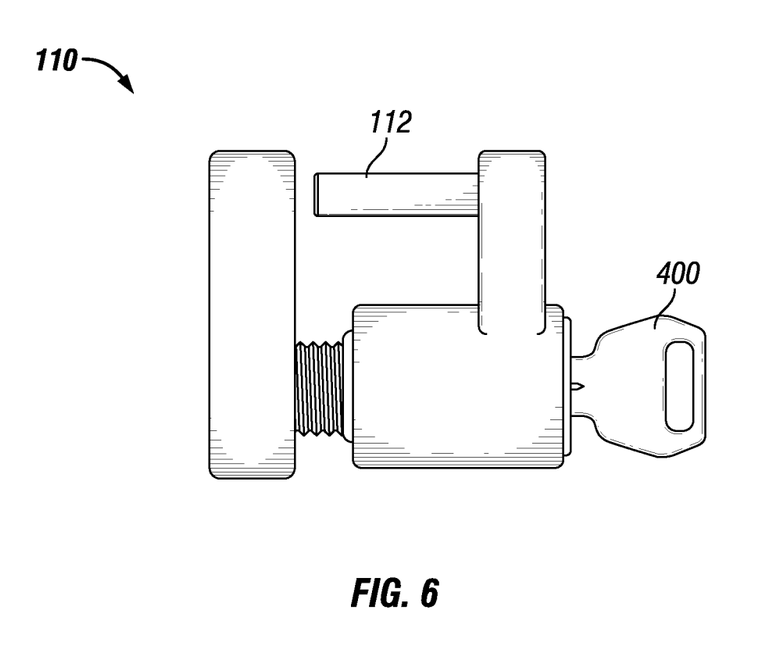
FIG. 6 illustrates a top view of an exemplary lock mechanism and a key, in accordance with an embodiment of the present invention.

Continuing with FIG. 4, the locking device 100 comprises a lock mechanism 110 that is configured to releasably fasten the handle portion 102 to the barrier portion 106; and thereby restrict the axial displacement of the dump handle 202 relative to the pipe section 204, which restricts displacement of the barrier 208 from the closed position. In one non-limiting embodiment, the bolt is a linear, metal member. In other embodiments, the bolt has a U-shape. The lock mechanism 110 may also include a tumbler mechanism, a warded lock, a pin tumbler lock, a magnetic keyed lock, and other locking means known in the art. FIG. 6 illustrates the lock mechanism 110 as a common tumbler lock known in the art.

In some embodiments, the lock mechanism 110 comprises at least one bolt that serves to extend and retract through the first fastening hole 116 in the first flange 104, or the second fastening hole 118 in the second flange 108, or both. The bolt is the rigid barrier 208 that inhibits the handle portion 102 and the barrier portion 106 from moving away from each other. Consequently, the dump handle 202 is restricted from axial displacement.

As FIG. 3 illustrates, the pipe opening 210 of the pipe section 204 is restricted by displacing the dump handle 202 laterally towards the pipe section 204, (inwardly) about 1 1/16". This forms the closed position. As discussed above, the locking device 100 engages both the dump handle 202 and the pipe section 204, while the barrier 208 is in the closed position, so as to restrict manipulation of the dump handle 202 back.

In this manner, extending the bolt through the fastening holes fastens the handle portion 102 to the barrier portion 106, so as to restrict axial displacement of the dump handle 202. Thus, the barrier 208 is restricted to the closed position. Conversely, retracting the bolt out of the fastening holes unfastens the handle portion 102 from the barrier portion 106, so as to enable axial displacement of the dump handle 202. Thus, the barrier 208 is released to the open position 206a.

The lock mechanism 110 is operable with a key 400 that selectively fastens and unfastens the bolt to extend and retract through the first and second fastening hole 118s. In this manner, the bolt of the lock mechanism 110 is fastened and unfastened through engagement with the key 400. In this manner, fastening the bolt with the key 400 serves to restrict the dump handle 202 from axial displacement to restrict displacement of the barrier 208 to the open position 206a. Similarly, unfastening the bolt with the key 400 releases the dump handle 202 to enable displacement of the barrier 208 to the open position 206a.

Figure 8:
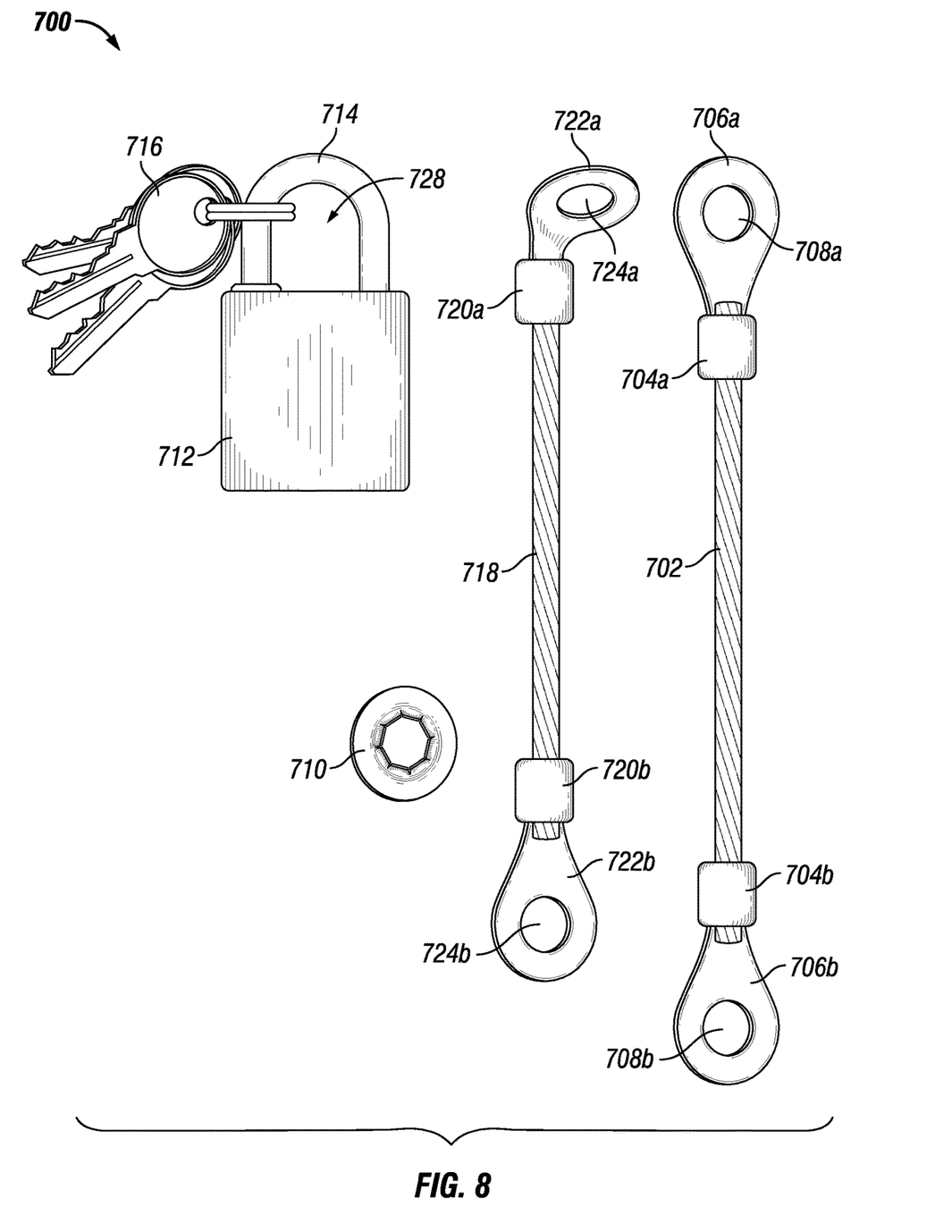
FIG. 8 illustrates a top view of the alternative embodiment of the dump handle locking device, showing a valve handle cable, a barrier cable, a lock mechanism having a U-shaped bolt, and a key, in accordance with an embodiment of the present invention.

In one embodiment, the key 400 is a flat section of metal consisting of a blade that slides into the keyway of the lock mechanism 110 and distinguishes between different keys, and a bow that is left protruding so that torque can be applied to the blade (FIGS. 6 and 8). In other embodiments, however, the key 400 may include, without limitation, a keycard, a fingerprint, RFID card, a security token, a coin, a digital key, a magnetic card, and a cryptography algorithm.

Figure 5:
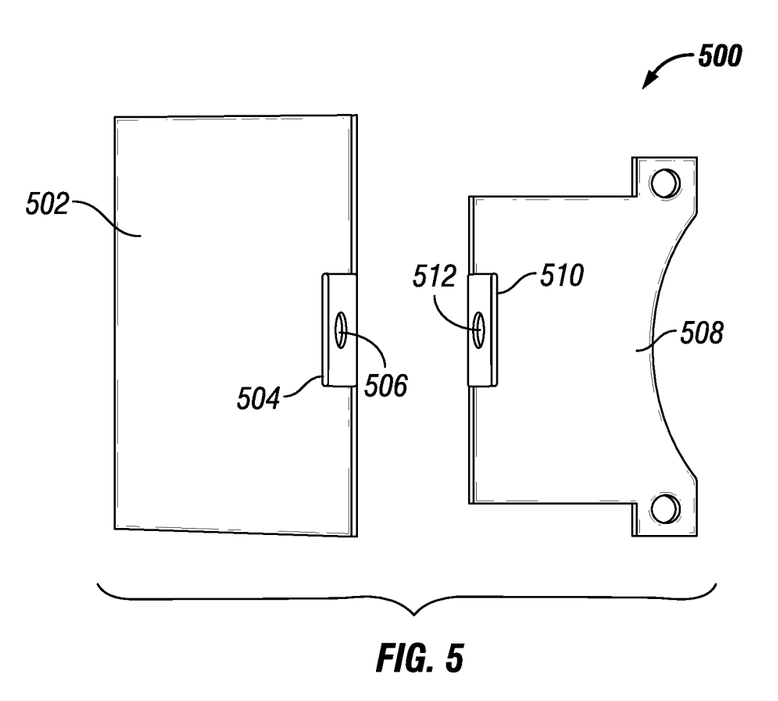
FIG. 5 illustrates a top view of an exemplary alternative embodiment of a dump handle locking device, showing a valve handle box and a lock plate, in accordance with an embodiment of the present invention.

The present invention is unique in that the handle portion and the barrier portion can have various configurations. For example, as FIG. 5 shows, a first embodiment of a locking device 500 is unique in that the handle portion is a valve handle box 502 that encapsulates the dump handle 202; while the barrier portion is a lock plate 508 that interfaces with the barrier 208 of the tank dump valve assembly 200. The lock mechanism 110 forms a nexus to releasably fasten the valve handle box 502 and the lock plate 508 together, while also enabling the valve handle box 502 and the lock plate 508 to be unfastened.

Figure 7:
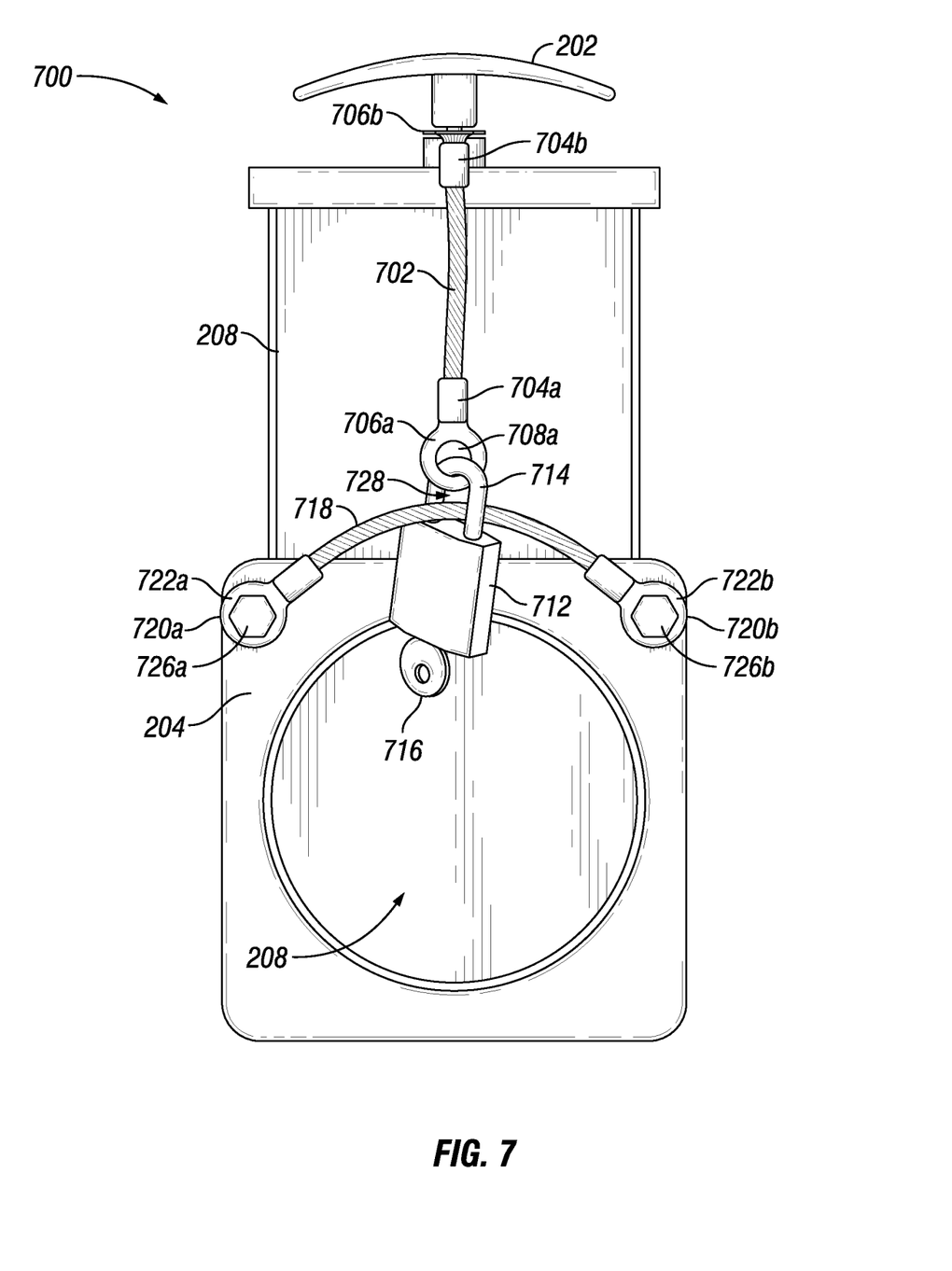
FIG. 7 illustrates a top view of another alternative embodiment of a dump handle locking device engaged with the tank dump valve assembly, showing a valve handle cable and a barrier cable, in accordance with an embodiment of the present invention.

In another exemplary embodiment shown in FIG. 7, the handle portion is a valve handle cable 702 that attaches to the dump handle 202; and the barrier portion is a barrier cable 718 that attaches to a pipe section 204 of the tank dump valve assembly 200. A lock mechanism 712 having a U-shaped bolt 714 forms a nexus to releasably lock the valve handle cable 702 and the barrier cable 718. However, in both alternative embodiments of the locking device, the attachment points and the restraint means for the handle portion and the barrier portion are substantially the same.

Looking again at FIG. 5, the handle portion may include a valve handle box 502 that encapsulates the dump handle 202. The valve handle box 502 is defined by a block shape having an opening and forming a voluminous inner cavity that enables at least partially encapsulation of the dump handle of the tank dump valve assembly 200. The voluminous configuration of the valve handle box 502 is configured to encapsulate irregularly shaped, and larger dump handles up to 6" in thickness.

Figure 1:
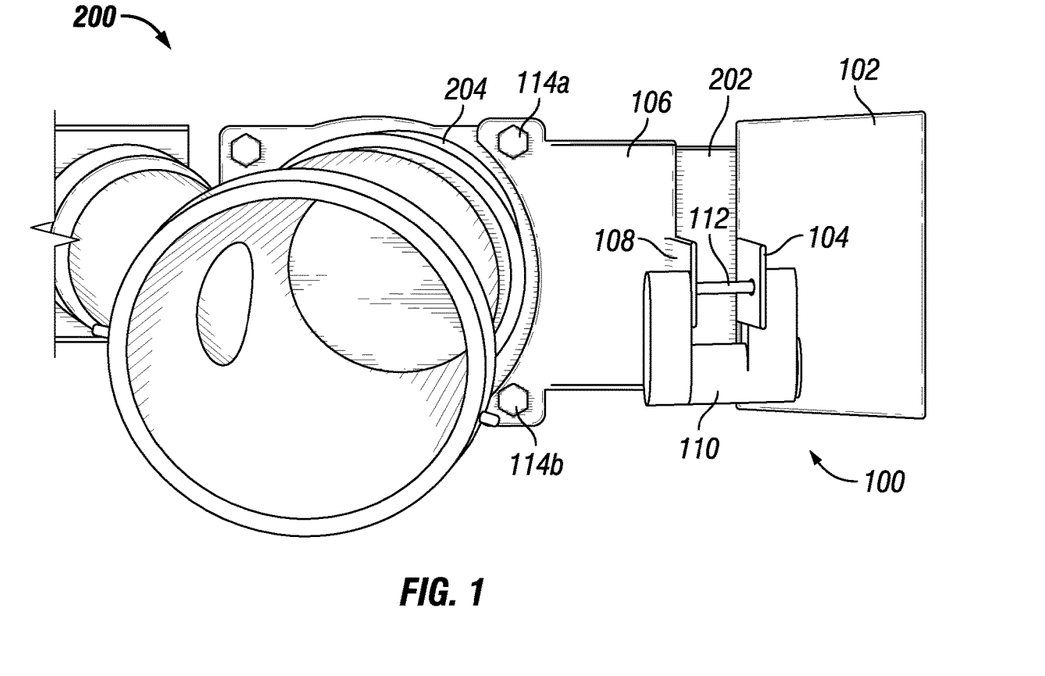
FIG. 1 illustrates a perspective view of an exemplary dump handle locking device operatively attached to a tank dump valve assembly, in accordance with an embodiment of the present invention.

In one non-limiting embodiment, the valve handle box 502 is rectangular and has a length of about 4" length and a width of about 2½". FIG. 1 shows the dimensional capacity of the valve handle box 502 to encapsulate the dump handle 202.

The valve handle box 502 comprises at least one first flange 504 forming at least one first fastening hole 506. The first fastening hole 506 enables passage of at least one fastener 114a-b that securely fastens the valve handle box 502 to the dump handle 202. In embodiments where the dump handle 202 comprises a stem and a grip, the valve handle box 502 encapsulates the grip, and the stem. Thus, the valve handle box 502 is releasably, yet securely, attached to the dump handle 202 of the tank dump valve assembly 200.

In this embodiment of the locking device 500, the barrier portion may include a lock plate 508 that interfaces with the barrier 208 in the tank dump valve assembly 200. Similar to the above embodiments, the lock mechanism 110 forms a nexus to releasably lock the valve handle box 502 and the lock plate 508 together; and to release the valve handle box 502 and the lock plate 508 from each other.

The lock plate 508 comprises at least one second flange 510. The second flange 510 forms at least one second fastening hole 512 that aligns with the first fastening hole 506 of the first flange 504. In one non-limiting embodiment, the lock plate 508 has a length of about 4¾" and a width of about 2½". Though other dimensions and shapes may be used for the lock plate 508 to accommodate different styles of pipe sections. Suitable materials for the lock plate 508 may include, without limitation, aluminum, steel, and metal alloys.

The lock plate 508 is disposed perpendicularly to the second flange 510. Further, the lock plate 508 is fastenable to the pipe section 204 of the tank dump valve 200. In some embodiments, the second fastening hole 512 corresponds to the first fastening hole 506 of the first flange 504. The second flange 510 is configured to align with, and rest flush with the pipe section 204 of the tank dump valve assembly 200 for fastening the lock plate 508 thereto.

In the valve handle box 502 and lock plate 508 configuration, a lock mechanism comprising at least one bolt 112 is operable to extend and retract through the first fastening hole 506 in the first flange 504 and the second fastening hole 512 in the second flange 510. In this manner, extending the bolt 112 through the fastening holes 506, 512 fastens the valve handle box 502 to the lock plate 508, so as to restrict axial displacement of the dump handle 202, whereby the barrier is restricted to the closed position 206b. Conversely, retracting the bolt 112 out of the fastening holes 506, 512 unfastens the valve handle box 502 from the lock plate 508, so as to enable axial displacement of the dump handle 202, whereby the barrier 208 is released to the open position 206a.

Further, a key 400 is operable with the lock mechanism. The key 400 selectively fastens and unfastens the bolt 112 to extend and retract through the first and second fastening holes 506, 512. Thus, fastening the bolt with the key restricts the dump handle 202 from axial displacement to restrict displacement of the barrier to the open position 206a. And unfastening the bolt with the key 400 releases the dump handle 202 to enable displacement of the barrier 208 to the open position 206a.

Turning now to FIG. 7, another embodiment of a locking device 700 utilizes a valve handle cable 702 as the handle portion. The valve handle cable 702 is configured to fixedly attach to the dump handle. This embodiment of a locking device 700 also utilizes a barrier cable 718 that attaches to the pipe section 204 of the tank dump valve assembly 200. The cables 702, 718 may include a steel, braided cable that is difficult to cut, and thereby prevents the dump handle from unauthorized manipulation. Similar to above, a lock mechanism 712 forms a nexus to releasably lock the valve handle cable 702 and the barrier cable 718. In either case, the attachment points and the restraint means are substantially the same as the valve handle box and the lock plate described above.

As illustrated in FIG. 8, the valve handle cable 702 is defined by a free end 704a and a mount end 704b. The free and mount ends 704a, 704b comprise at least one first flange 706a, 706b forming at least one first fastening hole 708a, 708b. The first flange 706b of the mount end 704b is fixedly attached to the dump handle 202, as illustrated in FIG. 7. In some embodiments, the first flange 706a of the valve handle cable 702 may include at least one ring anchor and a washer 710. The free end 704a of the valve handle cable 702 is releasably attached to a lock mechanism 712, passing through a U-shaped bolt 714 thereof, as described below.

Continuing, the barrier cable 718 comprises opposing ends 720a, 720b. The ends have a pair of connecting rings 722a, 722b forming at least one second fastening hole 724a, 724b. The connecting rings 722a-b are fixedly attached to the pipe section 204 of the tank dump valve assembly 200. At least one fastener 726a, 726b, or various fastening means known in the art, including a bolt, a screw, a magnet, and an adhesive may be used to fasten the connecting rings 722a, 722b to the pipe section 204 of the tank dump valve assembly 200.

The valve handle cable 702 and barrier cable 716 configuration utilizes a lock mechanism 712 having a U-shaped bolt 714 that forms a space 728. The U-shaped bolt 714 extends and retracts through the first fastening hole 708a in the first flange 706a. The space 718 in the U-shaped bolt 714 enables passage of the barrier cable 716 there through.

In this manner, extending the U-shaped bolt 714 through the first fastening hole serves to fasten the valve handle cable 702 to the barrier cable 716. This restricts axial displacement of the dump handle 202, whereby the barrier 208 is restricted to the closed position 206b. Conversely, retracting the U-shaped bolt 714 out of the first fastening hole 708a serves to unfasten the valve handle cable 702 from the barrier cable 716. This enables axial displacement of the dump handle, such that the barrier is released to the open position 206a.

Continuing, a key 716 is operable with the lock mechanism. The key 716 selectively fastens and unfastens the U-shaped bolt 714 to extend and retract through the first fastening hole 708a. Fastening the U-shaped bolt 714 with the key 716 restricts the dump handle from axial displacement to restrict displacement of the barrier to the open position 206a. And unfastening the U-shaped bolt 714 with the key 716 releases the dump handle to enable displacement of the barrier 208 to the open position. In this manner, unauthorized opening of a tank dump valve assembly 200 and accidental dumping of fluids and waste through the pipe section 204 of the tank dump valve assembly 200 is prevented.

In this manner, a user can restrict the pipe opening 210 by restricting the barrier to the closed position. Further, the locking device 100, 500, 700 is tamper resistant and is generally capable of use with tank dump valves produced by manufacturers known in the art. And as discussed above, the voluminous inner cavity of the valve handle box and the flexible configuration of the cables enables operation with variously sized and dimensioned dump handles, which creates a universal aspect to the locking device.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A dump handle locking device for securing a sanitation dump lock, the device comprising:
 a tank dump valve assembly comprising a pipe section defined by a pipe opening, the tank dump valve assembly further comprising a barrier displaceable between an open position and a closed position to uncover and cover the pipe opening, the tank dump valve assembly further comprising a dump handle attached to the barrier, the dump handle axially displaceable to control the position of the barrier between the open position uncovering the pipe opening and a closed position covering the pipe opening;
 a handle portion detachably joined to the dump handle, the handle portion being defined by at least one first flange forming at least one first fastening hole, wherein the handle portion comprises a valve handle cable defined by a free end and a mount end joined to the first flange, the mount end being fixedly attached to the dump handle, the free end being releasably attached to the lock mechanism;

a barrier portion detachably joined to the pipe section, the barrier portion being defined by at least one second flange forming at least one second fastening hole, the second fastening hole corresponding to the first fastening hole of the first flange, wherein the barrier portion comprises a barrier cable having two ends, the ends comprising a pair of connecting rings forming at least one second fastening hole, the connecting rings being fixedly attached to the pipe section of the tank dump valve assembly;

a lock mechanism comprising at least one bolt, the bolt of the lock mechanism extending and retracting through the first fastening hole in the first flange and the second fastening hole in the second flange, whereby extending the bolt through the fastening holes fastens the handle portion to the barrier portion, so as to restrict axial displacement of the dump handle, whereby the barrier is restricted to the closed position, whereby retracting the bolt out of the fastening holes unfastens the handle portion from the barrier portion, so as to enable axial displacement of the dump handle, whereby the barrier is released to the open position; and a key operable with the lock mechanism, the key selectively fastening and unfastening the bolt to extend and retract through the first and second fastening holes, whereby fastening the bolt with the key restricts the dump handle from axial displacement to restrict displacement of the barrier to the open position, whereby unfastening the bolt with the key releases the dump handle to enable displacement of the barrier to the open position.

2. A dump handle locking device for securing a sanitation dump lock, the device comprising:

a valve handle cable defined by a free end and a mount end, the free and mount ends comprising at least one first flange forming at least one first fastening hole, the first flange of the mount end being fixedly attached to the dump handle, the free end being releasably attached to the lock mechanism;

a barrier cable comprising opposing ends, the ends comprising a pair of connecting rings forming at least one second fastening hole, the connecting rings being fixedly attached to the pipe section of the tank dump valve assembly;

a lock mechanism comprising a U-shaped bolt, the U-shaped bolt extending and retracting through the first fastening hole in the first flange, the U-shaped bolt forming a space that enables passage of the barrier cable, whereby extending the U-shaped bolt through the first fastening hole fastens the valve handle cable to the barrier cable, so as to restrict axial displacement of the dump handle, whereby the barrier is restricted to the closed position, whereby retracting the U-shaped bolt out of the first fastening hole unfastens the valve handle cable from the barrier cable, so as to enable axial displacement of the dump handle, whereby the barrier is released to the open position; and a key operable with the lock mechanism, the key selectively fastening and unfastening the U-shaped bolt to extend and retract through the first fastening hole, whereby fastening the U-shaped bolt with the key restricts the dump handle from axial displacement to restrict displacement of the barrier to the open position, whereby unfastening the U-shaped bolt with the key releases the dump handle to enable displacement of the barrier to the open position.

* * * * *